United States Patent
Fujimoto et al.

[11] Patent Number: 5,127,372
[45] Date of Patent: Jul. 7, 1992

[54] EXHAUST SILENCER SYSTEM FOR TWO-CYCLE ENGINE

[75] Inventors: Hiroaki Fujimoto; Seiji Inoue, both of Hamamatsu, Japan

[73] Assignee: Sanshin Kogyo Kabushiki Kaisha, Hamamatsu, Japan

[21] Appl. No.: 575,282

[22] Filed: Aug. 30, 1990

[30] Foreign Application Priority Data

Aug. 30, 1989 [JP] Japan ................. 1-221632

[51] Int. Cl.⁵ ............................................. F01N 1/02
[52] U.S. Cl. ................................ 123/65 PE; 60/312
[58] Field of Search ................... 123/65 PE; 60/314

[56] References Cited

U.S. PATENT DOCUMENTS 4,068,630 1/1978 Bennett et al. ............... 123/90.17 X

FOREIGN PATENT DOCUMENTS

| 156924 | 8/1985 | Japan | 123/65 PE |
| 186908 | 8/1988 | Japan | 123/65 PE |
| 1-8656 | 3/1989 | Japan . | |
| 1-163416 | 6/1989 | Japan . | |
| 1016545 | 5/1983 | U.S.S.R. | 123/65 PE |
| 199880 | 7/1923 | United Kingdom | 123/65 PE |

Primary Examiner—Tony M. Argenbright
Attorney, Agent, or Firm—Ernest A. Beutler

[57] ABSTRACT

An exhaust silencing system for a two-cycle ported engine including an expansion chamber that communicates with the cylinder through a communication port that is opened before the exhaust port of the engine is opened so as to permit the exhaust gases to expand and reduce the noise of the engine. The communication port is either fully opened before the exhaust port is initially opened so as to achieve maximum silencing and/or is fully closed before the exhaust port is fully closed so as to avoid loss of effective compression pressure.

6 Claims, 5 Drawing Sheets

5,127,372

EXHAUST SILENCER SYSTEM FOR TWO-CYCLE ENGINE

BACKGROUND OF THE INVENTION

This invention relates to an exhaust silencer system for a two-cycle engine and more particularly to an improved arrangement for silencing the exhaust gases of a ported two-cycle engine.

Although two-cycle engines are widely used for a variety of applications because of their simplicity and their high power output per displacement, there are some disadvantages with such engines. One problem particularly prevalent with two-cycle engines is the noise associated with their exhaust. This noise is a result of several factors, one of which is the fact that the exhaust gases are discharged to the atmosphere during each rotation of the crankshaft as opposed to every other crankshaft rotation as with a four-cycle engine. In addition, the porting of the engine causes the exhaust gases to emanate from the exhaust port quite rapidly and this itself gives rise to significant silencing problems.

In addition, two-cycle engines are normally employed in relatively confined applications such as outboard motors, motorcycles or the like wherein the provision of a large and complex exhaust silencing system is not possible. As a result, there is some objection to the use of two-cycle engines even in these applications due to the difficulty in silencing.

It has been proposed to silence the exhaust gases of a two-cycle engine by providing an expansion chamber into which the exhaust gases can expand before the exhaust port is opened. However, the previously proposed constructions have been such that the communicating passageway that communicates the cylinder with the expansion chamber is not fully opened before the exhaust port is opened. As a result, the full utilization of the expansion chamber cannot be employed.

Furthermore, the prior art systems have had the disadvantage that the communication passageway is open after the exhaust port is closed and when the piston is still traveling toward its top dead center position. As a result, these type of devices tend to reduce the effective compression ratio of the engine and, accordingly, its power output.

In addition to the aforenoted defects, those systems which have been previously proposed have necessitated the formation of the expansion chamber either in the cylinder head in whole or in part and also have not afforded an opportunity to provide any cooling for the expansion chamber.

It is, therefore, a principal object of this invention to provide an improved exhaust silencer system for a two-cycle engine.

It is a further object of this invention to provide an exhaust silencer system for a two-cycle engine that includes an expansion chamber and a communicating port that communicates the expansion chamber with the cylinder but which will not have the defects of the prior art constructions.

It is a further object of this invention to provide an improved exhaust silencing system utilizing an expansion chamber that communicates with the cylinder but wherein the compression ratio of the engine is not adversely affected.

It is a further object of this invention to provide an exhaust silencer for a two-cycle engine employing an expansion chamber and wherein the expansion chamber communicates completely with the cylinder before the exhaust port opens.

It is a further object of this invention to provide a silencing system for a two-cycle engine including an expansion chamber and a valve that can be tailored to control the expansion chamber so as to not adversely affect other conditions of the engine and also to achieve maximum silencing.

It is a still further object of this invention to provide an expansion chamber silencing device for a two-cycle engine wherein the expansion chamber is cooled so as to assist in silencing.

SUMMARY OF THE INVENTION

This invention is adapted to be embodied in an exhaust silencer system for a ported two-cycle internal combustion engine comprising a cylinder that receives a piston, an exhaust port in said cylinder opened and closed by the associated piston and having an initially opened position, a fully opened position, a beginning closing position and a fully closed position. An expansion volume is provided that communicates with the cylinder through a communication port. Means are provided for controlling the communication port between an initially opened position before the exhaust port is in its initially opened position and at least one of a fully opened position before the exhaust port is in its initially opened position or in a fully closed position before the exhaust port is in its fully closed position.

DETAILED DESCRIPTION OF THE PREFERRED EMBODIMENTS

Figure 1:
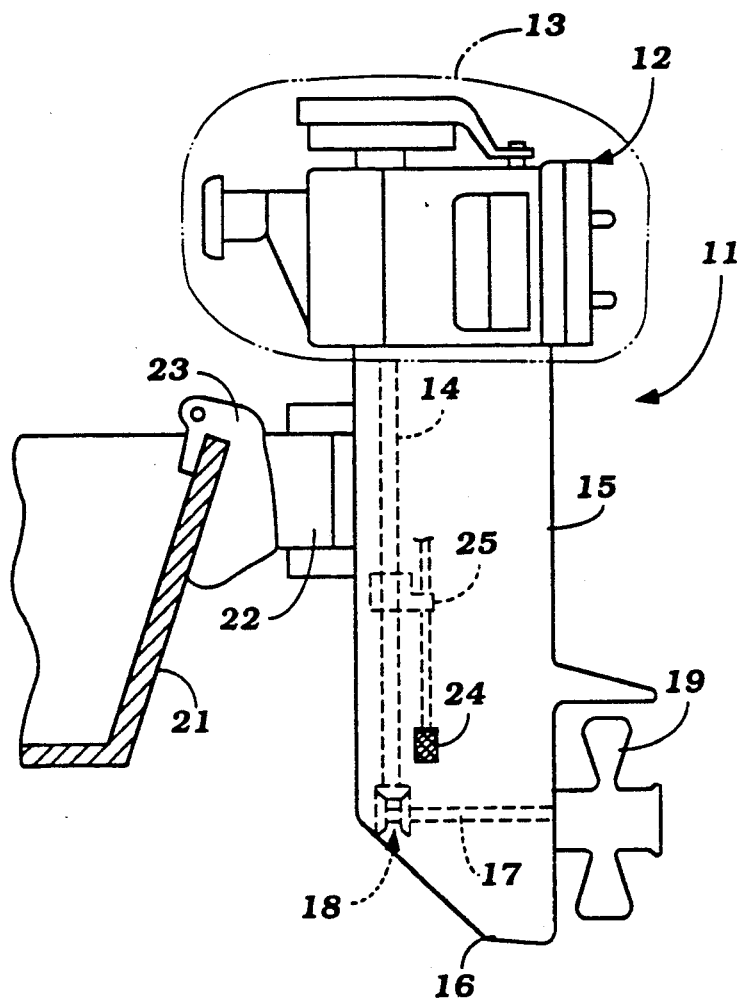
FIG. 1 is a side elevational view of an outboard motor attached to the transom of a watercraft which is shown partially and in cross-section and which outboard motor includes an exhaust silencing system constructed in accordance with a first embodiment of the invention.

Referring first to FIG. 1, an outboard motor constructed in accordance with an embodiment of the invention is identified generally by the reference numeral 11. The invention is described in conjunction with an outboard motor because the invention has particular utility with two-cycle, crankcase compression, internal combustion engines as are normally used with outboard motors. It is to be understood, however, that the invention is capable of use in other applications for such two-cycle engines.

The outboard motor 11 includes a power head consisting of a two-cycle, crankcase compression, internal combustion engine 12 and a surrounding protective cowling which is shown in phantom and is identified by the reference numeral 13. In the illustrated embodiment, the engine 12 is of the two cylinder inline type. It should be readily apparent, however, to those skilled in the art how the invention can be utilized in conjunction with other cylinder numbers and configurations.

The engine 12 has a crankshaft, to be described, that is coupled to a drive shaft 14 which is journaled for rotation about a vertically extending axis within a drive shaft housing 15. This drive shaft 14 extends into a lower unit 16 to drive a propeller shaft 17 through a conventional bevel gear type forward, neutral, reverse transmission 18. A propeller 19 is affixed to the propeller shaft 17 in a known manner for propelling the associated watercraft, which is partially shown and is identified generally by the reference numeral 21.

The outboard motor 11 is affixed to the transom of the watercraft 21 by means of a swivel bracket 22 and clamping bracket 23 which afford tilt and trim movement of the outboard motor 11 as well as steering movement of it in a known manner.

The engine 12 is water cooled and coolant for the cooling system is drawn through an underwater inlet 24 formed in the lower unit 16 by a water pump 25 that is driven by the drive shaft 14 and which is positioned between the lower end of the drive shaft housing 15 and the upper end of the lower unit 16.

The construction of the outboard motor as thus far described may be considered to be conventional and since the invention relates to the engine and particularly to the exhaust silencing arrangement therefor, further description of the outboard motor is believed to be unnecessary.

Figure 2:
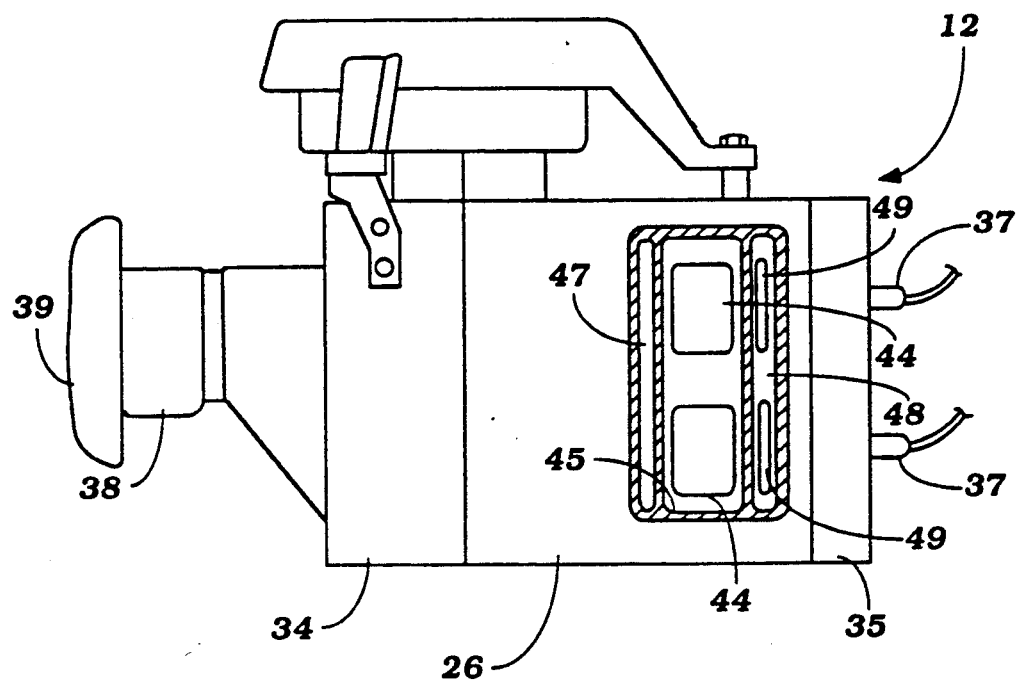
FIG. 2 is a cross-sectional view taken along the line 2—2 of FIG. 3.
Figure 3:
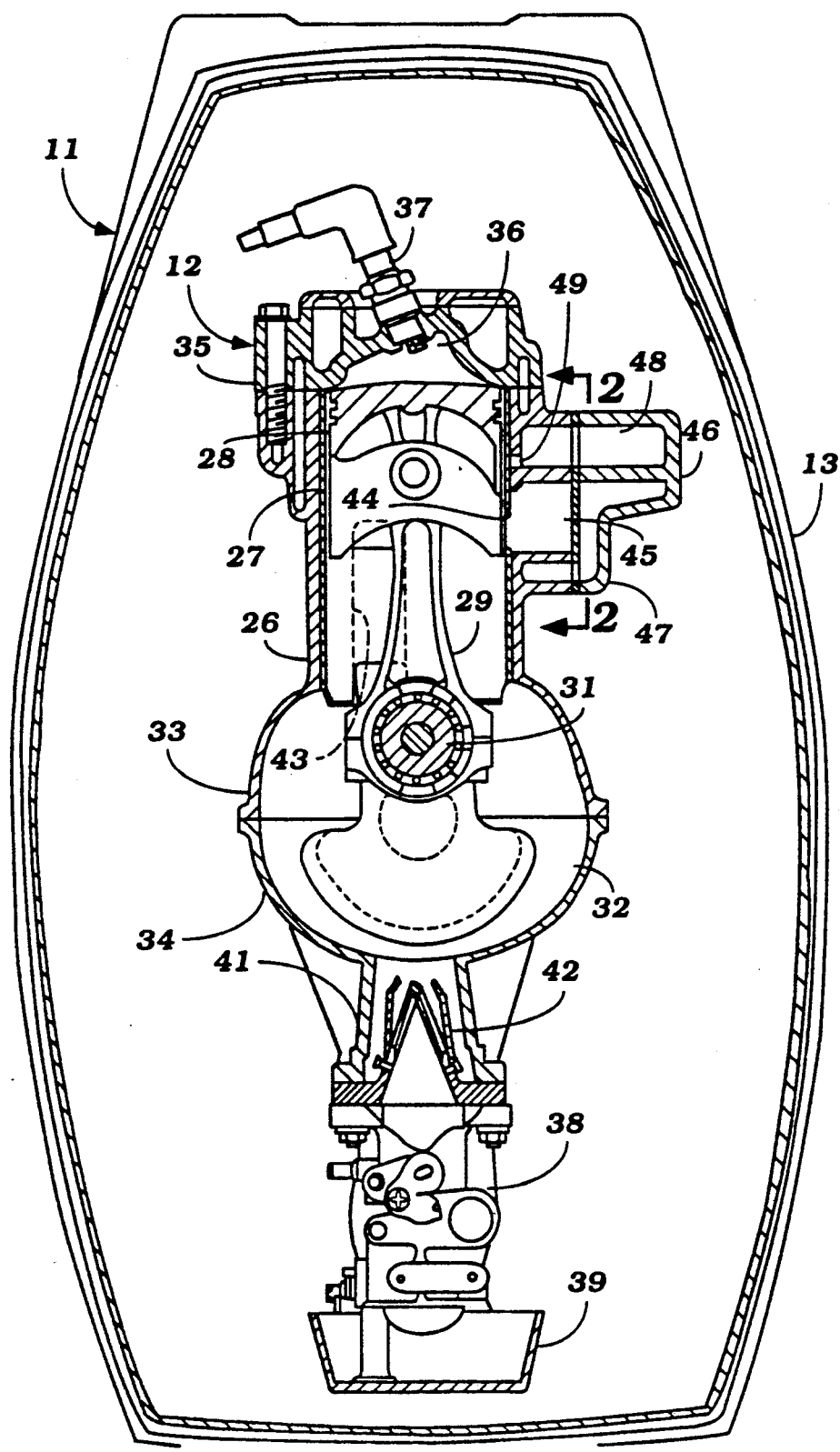
FIG. 3 is a cross-sectional view taken along a horizontal plane and on an enlarged scale through the power head of the outboard motor.

Referring now additionally to FIGS. 2 and 3, the engine 12 includes a cylinder block 26 in which a pair of cylinder bores are formed by liners 27. Pistons 28 reciprocate in these cylinder bores and are connected by means of connecting rods 29 to a crankshaft 31, aforereferred to. The crankshaft 31 is journaled within a crankcase chamber 32 formed by a skirt portion 33 of the cylinder block 26 and a crankcase member 34 that is affixed to the cylinder block 26 in a known manner.

A cylinder head 35 is affixed to the cylinder block 26 at the end opposite the crankcase member 34 and is formed with combustion chamber recesses 36. Spark plugs 37 are carried by the cylinder head 35 for firing the charge in the combustion chamber recesses 36 in a known manner.

As is typical with two-cycle engine practice, the individual crankcase chambers 32 associated with each of the cylinders formed by the liners 27 are sealed from each other in an appropriate manner. A fuel/air charge is delivered to each of these chambers 32 by one or more carburetors 38. The carburetors 38 draw fresh air from within the protectice cowling 13 through an air intake device 39 and discharge it into the crankcase chambers 32 through a manifold 41 in which reed type check valves 42 are provided so as to prevent reverse flow when the pistons 28 are approaching their bottom dead center position.

The charge compressed within the crankcase chambers 32 is transferred to the area above the pistons 28 on their descent through one or more scavenge passages 43. This compressed charge is then fired by the spark plugs 37, as aforenoted, and is discharged to the atmosphere through an exhaust system that includes an exhaust port 44 formed in the cylinder liner 27 and which communicates with an exhaust manifold 45 formed at least in part in the cylinder block 26. A cover plate 46 is affixed over the exhaust manifold 43 and is formed with a cooling jacket 47 that receives coolant from the engine cooling jacket in a well known manner.

In accordance with the invention, an expansion chamber 48 is formed by the cylinder block 26 and the cover plate 46 adjacent the cooling jacket 47. As a result, exhaust gases which are delivered into the expansion chamber 48 in the manner to be described will be cooled by the engine coolant so as to further assist in silencing. The expansion chamber 48 communicates with the respective combustion chambers or cylinders formed by the liners 27 through ports 49 which are disposed vertically above the exhaust ports 44. As a result of this vertical disposition above the exhaust ports 44, the expansion chamber 48 will communicate completely with the cylinder before the exhaust ports 44 open. This will insure good silencing.

Figure 4:
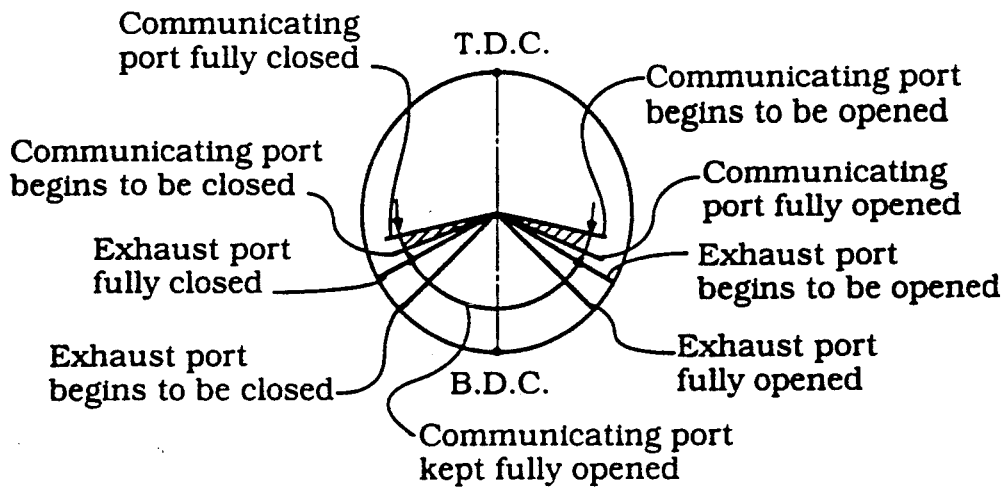
FIG. 4 is a port timing diagram of this embodiment of the invention.

The timing of the port opening may be best seen in FIG. 4 wherein the direction of rotation occurs in a clockwise direction. As may be seen, when the piston 28 moves downwardly, first the communication ports 49 will be initially opened, then they will be fully opened before the exhaust port begins to open. The exhaust port then moves to its fully opened position, its initial closing position and its fully closed position before the communication prt 49 begins to close. Of course, this construction, therefore, presents some loss of effective compression ratio but does achieve optimum silencing.

Figure 5:
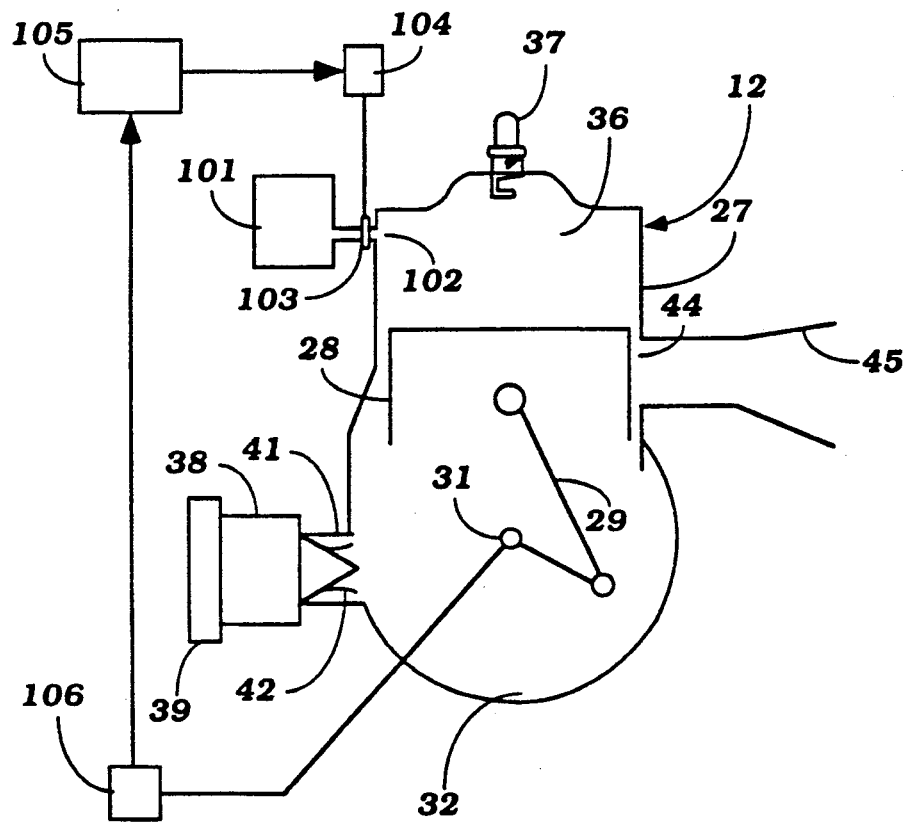
FIG. 5 is a schematic cross-sectional view taken through a two-cycle, crankcase compression, internal combustion engine constructed in accordance with another embodiment of the invention.

FIG. 5 shows another embodiment of the invention wherein the general components are the same as those of the previously described embodiment. For that reason, those components which are basically the same have been identified by the same reference numerals and have only been shown schematically.

In this embodiment, an expansion chamber 101 communicates with the cylinder bore through a communication port 102. The port 102 is opened and closed, not by the piston 28 per se but rather by a shutter valve 103 that is operated by means of a solenoid 104 or other form of servo motor. The solenoid 104 is operated by a control device 105 which receives an input signal from a crank angle sensor 106 and opens and closes the shutter valve 102 in accordance with any of a plurality of predetermined types of strategies. One such strategy may achieve initial opening of the communication port 102 and full opening of the communication port 102 through movement of the shutter valve 103 before the exhaust port 44 opens and closure in accordance with the same sequence as shown in FIG. 4 and provided for by the embodiment of FIGS. 1 through 4. Of course, such an arrangement would have the disadvantages as aforenoted. That is, the effective compression ratio would be reduced.

Figure 6:
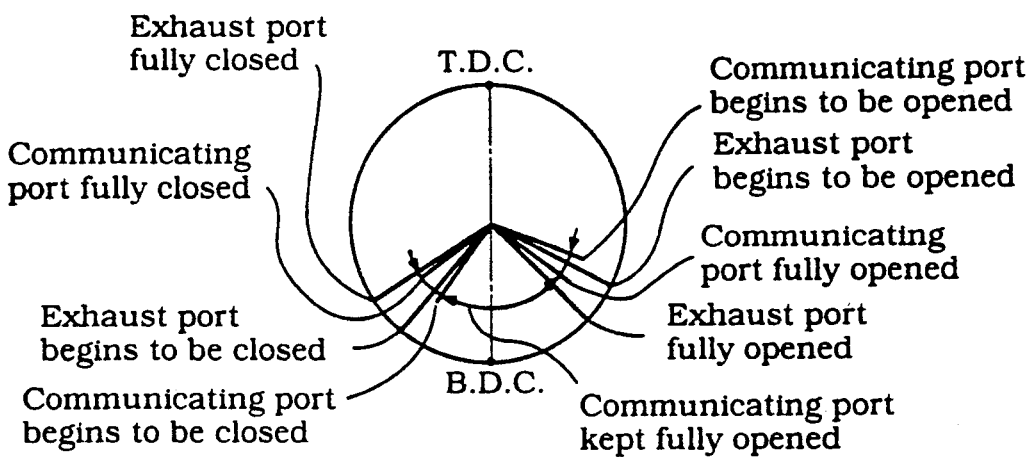
FIG. 6 is a port timing diagram showing one method in which the embodiment of FIG. 5 may be operated.

One prefered method of operation of the embodiment of FIG. 5 is shown in FIG. 6 which is a timing diagram corresponding generally to the timing diagram of FIG. 4 but, of course, with the different port timing. In this embodiment, the communication port 102 is opened initially by operation of the shutter valve 103 before the exhaust port 44 begins to open. However, the full opening of the communication port 102 may be deferred by delaying the rate of opening of the shutter valve 103 until after the exhaust port has become partially opened but not fully opened. The shutter valve 103 can then be actuated so as to begin closing of the communication port 102 before the exhaust port 44 begins to close with the communication port 102 being fully closed before the exhaust port 44 is fully closed. With such an arrangement, loss of compression ratio will be avoided while obtaining the advantages of the previously described embodiment.

Figure 7:
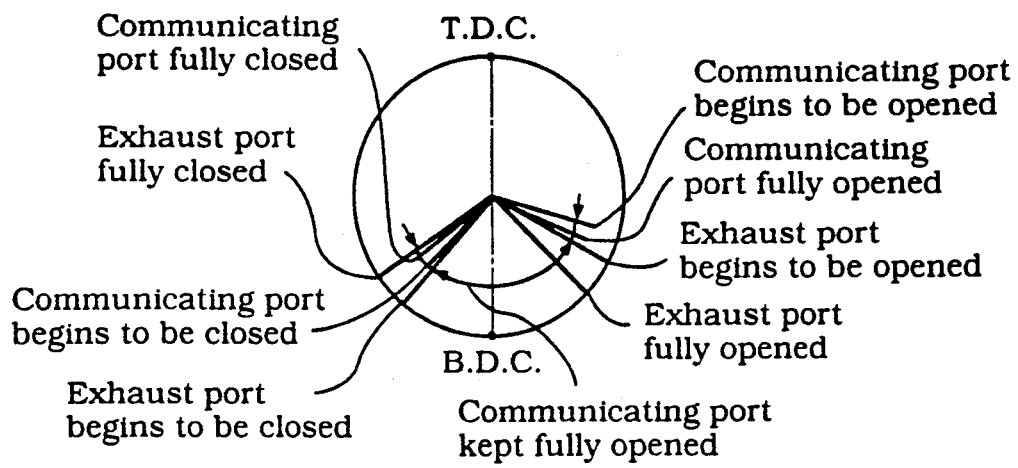
FIG. 7 is a port timing diagram showing another method by which the embodiment of FIG. 5 may be operated.

FIG. 7 shows another mode of operation wherein the communication port is not only initially opened but fully opened before the exhaust port begins to open. In this way, then the advantages of the embodiment of FIGS. 1 through 4 insofar as maximum effective silencing can be achieved. However, in the mode of operation of this embodiment, the communication port 102 will begin to be closed after the exhaust port begins to close but will be fully closed before the exhaust port is fully closed thus providing the advantages of the method of operation of FIG. 6.

It should be readily apparent from the foregoing description that the described embodiments of the invention and their modes of operation are very effective in achieving good exhaust silencing with a two-cycle ported internal combustion engine without all of the disadvantages of the prior art. Of course, the embodiments disclosed are only preferred embodiments and various changes and modifications may be made without departing from the spirit and scope of the invention, as defined by the appended claims.

We claim:

1. An exhaust silencing system for a ported two-cycle internal combustion engine comprising a cylinder, a piston reciprocating in said cylinder, an exhaust port in said cylinder opened and closed by said piston and having an initially opened position, a fully opened position, a beginning closing position and a fully closed position, an expansion volume, a communication port for communicating said cylinder with said expansion volume and means for controlling said communication port between an initially opened position before said exhaust port is in its initially opened position and at least one of a fully opened position before said exhaust port is in its initially opened position and a fully closed position before said exhaust port is in its fully closed position comprising a separate operable valve.

2. An exhaust silencing system as set forth in claim 1 wherein the separately operated valve places the communication port in its fully closed position before the exhaust port is in its fully closed position.

3. An exhaust silencing system for a ported two-cycle internal combustion engine comprising a cylinder, a piston reciprocating in said cylinder, an exhaust port in said cylinder opened and closed by said piston and having an initially opened position, a fully opened position, a beginning closing position and a fully closed position, an expansion volume, a communication port for communicating said cylinder with said expansion volume, means for controlling said communication port between an initially opened position before said exhaust port is in its initially opened position and at least one of a fully opened position, before said exhaust port is in its initially opened position and a fully closed position before said exhaust port is in its fully closed position, and liquid cooling means for cooling said expansion chamber.

4. An exhaust silencing system as set forth in claim 3 wherein the cylinder is formed by a cylinder block and the expansion chamber is formed at least in substantial portion by the cylinder block.

5. An exhaust silencing system as set forth in claim 4 wherein the means for controlling the communication port places the communication port in its fully opened position before the exhaust port is in its initially opened position.

6. An exhaust silencing system as set forth in claim 5 wherein the communication port is controlled by the piston movement.

* * * * *